United States Patent
Volz

(10) Patent No.: US 11,318,994 B2
(45) Date of Patent: May 3, 2022

(54) MOTOR VEHICLE HAVING AN ELECTRIC HYBRID DRIVE OR ELECTRIC DRIVE AND A CRASH ENERGY-ABSORPTION DEVICE

(71) Applicant: Bayerische Motoren Werke Aktiengesellschaft, Munich (DE)

(72) Inventor: Karlheinz Volz, Gilching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 123 days.

(21) Appl. No.: 16/759,451

(22) PCT Filed: Dec. 13, 2018

(86) PCT No.: PCT/EP2018/084658
§ 371 (c)(1),
(2) Date: Apr. 27, 2020

(87) PCT Pub. No.: WO2019/154543
PCT Pub. Date: Aug. 15, 2019

(65) Prior Publication Data
US 2020/0331532 A1   Oct. 22, 2020

(30) Foreign Application Priority Data

Feb. 6, 2018 (DE) .................... 10 2018 201 805.7

(51) Int. Cl.
*B60J 7/00* (2006.01)
*B62D 21/15* (2006.01)
(Continued)

(52) U.S. Cl.
CPC .............. *B62D 21/152* (2013.01); *B60K 1/04* (2013.01); *B62D 21/03* (2013.01); *B60K 2001/0411* (2013.01)

(58) Field of Classification Search
CPC ......... H01L 2924/00; H01L 2924/0002; Y02T 10/70; B60G 9/00; H04W 72/042;
(Continued)

(56) References Cited

U.S. PATENT DOCUMENTS 6,158,538 A * 12/2000 Botzelmann ............. B60K 1/04
180/68.5
8,585,132 B2 * 11/2013 Klimek ................ B60K 15/067
296/193.07
(Continued)

FOREIGN PATENT DOCUMENTS

CN           103079899 A        5/2013
DE    10 2010 035 367 A1        4/2012
(Continued)

OTHER PUBLICATIONS

International Search Report (PCT/ISA/210) issued in PCT Application No. PCT/EP2018/084658 dated Mar. 14, 2019 with English translation (four (4) pages).
(Continued)

*Primary Examiner* — Kiran B Patel
(74) *Attorney, Agent, or Firm* — Crowell & Moring LLP

(57) ABSTRACT

A motor vehicle having a crash energy-absorption device includes a body, an electric hybrid drive or electric drive with an electrical machine and a vehicle battery, and an axle support. A support of the axle support is provided between the body-in-white of the motor vehicle and the axle support and/or a crash cross-beam for the axle support is provided.

9 Claims, 5 Drawing Sheets

(51) Int. Cl.
*B60K 1/04* (2019.01)
*B62D 21/03* (2006.01)

(58) Field of Classification Search
CPC ....... B62D 21/152; B62D 21/11; B60R 19/34; B60R 19/18; B60K 1/04
See application file for complete search history.

(56) References Cited

U.S. PATENT DOCUMENTS

| | | | | |
|---|---|---|---|---|
| 8,684,382 | B2* | 4/2014 | Buschjohann | B62D 21/11 280/124.109 |
| 2006/0181071 | A1* | 8/2006 | Mitsui | B62D 25/08 280/784 |
| 2015/0028626 | A1 | 1/2015 | Gopal et al. | |
| 2015/0360549 | A1* | 12/2015 | Merkel | B60K 17/12 180/65.1 |
| 2016/0068195 | A1* | 3/2016 | Hentrich | B62D 65/02 180/68.5 |
| 2017/0028833 | A1 | 2/2017 | Ewert et al. | |
| 2017/0106913 | A1 | 4/2017 | Schmalzrieth et al. | |
| 2017/0210218 | A1 | 7/2017 | Schmalzrieth et al. | |
| 2020/0039366 | A1* | 2/2020 | Neurath | B60K 1/04 |
| 2020/0331532 | A1* | 10/2020 | Volz | B62D 25/08 |

FOREIGN PATENT DOCUMENTS

| | | |
|---|---|---|
| DE | 10 2011 102 758 A1 | 11/2012 |
| DE | 20 2014 103 277 U1 | 9/2014 |
| DE | 10 2013 106 141 A1 | 12/2014 |
| DE | 10 2015 013 533 B3 | 9/2016 |
| DE | 10 2016 000 669 B3 | 1/2017 |
| DE | 10 2015 112 493 A1 | 2/2017 |
| DE | 10 2015 224 894 A1 | 6/2017 |
| WO | WO 2013/053433 A1 | 4/2013 |

OTHER PUBLICATIONS

German-language Written Opinion (PCT/ISA/237) issued in PCT Application No. PCT/EP2018/084658 dated Mar. 14, 2019 (five (5) pages).

German-language Search Report issued in German Application No. 102018201805.7 dated Sep. 28, 2018 with partial English translation (13 pages).

English translation of Chinese Office Action issued in Chinese Application No. 201880066095.3 dated Oct. 11, 2021 (five (5) pages).

* cited by examiner

MOTOR VEHICLE HAVING AN ELECTRIC HYBRID DRIVE OR ELECTRIC DRIVE AND A CRASH ENERGY-ABSORPTION DEVICE

BACKGROUND AND SUMMARY OF THE INVENTION

The invention relates to a motor vehicle having an electric hybrid drive or electric drive and a crash energy-absorption device.

Both an internal combustion engine and an electric drive unit are provided in an electric hybrid drive, whereas an electric drive has only an electric drive unit. The electric drive unit usually has an electrical machine and an inverter as well as a traction battery as an electrical energy storage device, which traction battery outputs a relatively high voltage (HV) in the range of from 200 V to 800 V and is therefore also called a HV storage means.

DE 10 2010 035 367 A1 discloses a motor vehicle of this kind which, as a crash energy-absorbing arrangement, has a deformation element which is arranged in a clearance between the traction battery and a vehicle body outer skin and, in the event of a collision (head-on crash), absorbs collision energy and settles over a large surface area of the traction battery. The electrical machine is arranged below the traction battery and is therefore not subjected to the action of the deformation element in the event of a collision.

The invention is based on the object of providing a protective concept which renders possible more advanced protection than is the case in the known motor vehicle.

The following statements relate to a motor vehicle of the type, in which the motor vehicle has the electric drive unit and then the traction battery in the order from front (front-end structure) to the rear, and the crash scenario is a head-on crash. However, in principle, an arrangement according to the invention could also be arranged on the rear side (wherein the crash scenario is then a rear-end crash).

When, according to the invention, a supporting apparatus is provided between the axle support (front axle support) and the body shell, an additional load path for the head-on crash is constructed by targeted support of the axle support on the body shell, which additional load path minimizes backward movement of the electric drive unit. As a result, the requisite high-voltage safety can be ensured after a head-on crash.

A further load path, which stabilizes the (front) axle support during the head-on crash, is generated by a crash crossmember in the (rear) region of the (front) axle support. As a result, greater deformation forces can be transferred, and therefore intrusions are minimized.

The supporting element can be designed as a so-called delta element, which means that it is triangular in vertical section (in the plane of the longitudinal axis and the vertical axis of the motor vehicle).

The crash crossmember can be designed for introducing a load in the event of a crash into a lower part, which is designed approximately as an annular armature, of a housing which encloses the traction battery, more precisely by introducing the load into a front section of the lower part or annular armature. Ingress of the electrical drive unit into the traction battery is further minimized in this way.

Particularly for the purpose of protecting the inverter, but also in order to further minimize a backward movement of the entire electric drive unit in the event of a head-on crash, a deformation element which is fitted to the electrical machine can be provided in front of the electrical machine in a manner extending forward from the electrical machine.

The deformation element extends forward from the electrical machine, but is not supported against the body shell outer skin at the front.

The deformation element can have a honeycomb or sandwich structure. Different materials and/or combinations of materials come be used as material for the deformation element; for example metal, a layer structure for example comprising a plate, a foam and a covering layer, or CRP which ensures defragmentation and high energy absorption.

Each of the measures according to the invention, specifically (a) the supporting apparatus and (b) the crash crossmember, on its own already leads to an improvement in the crash behavior and therefore to increased safety. A combination of these two measures results in a further improved crash behavior and therefore further increased safety.

A yet further optimized behavior in the event of a crash can be achieved by providing the deformation element.

The invention will be explained in more detail below with reference to exemplary embodiments which are illustrated in the drawings.

DETAILED DESCRIPTION OF THE DRAWINGS

Figure 1:
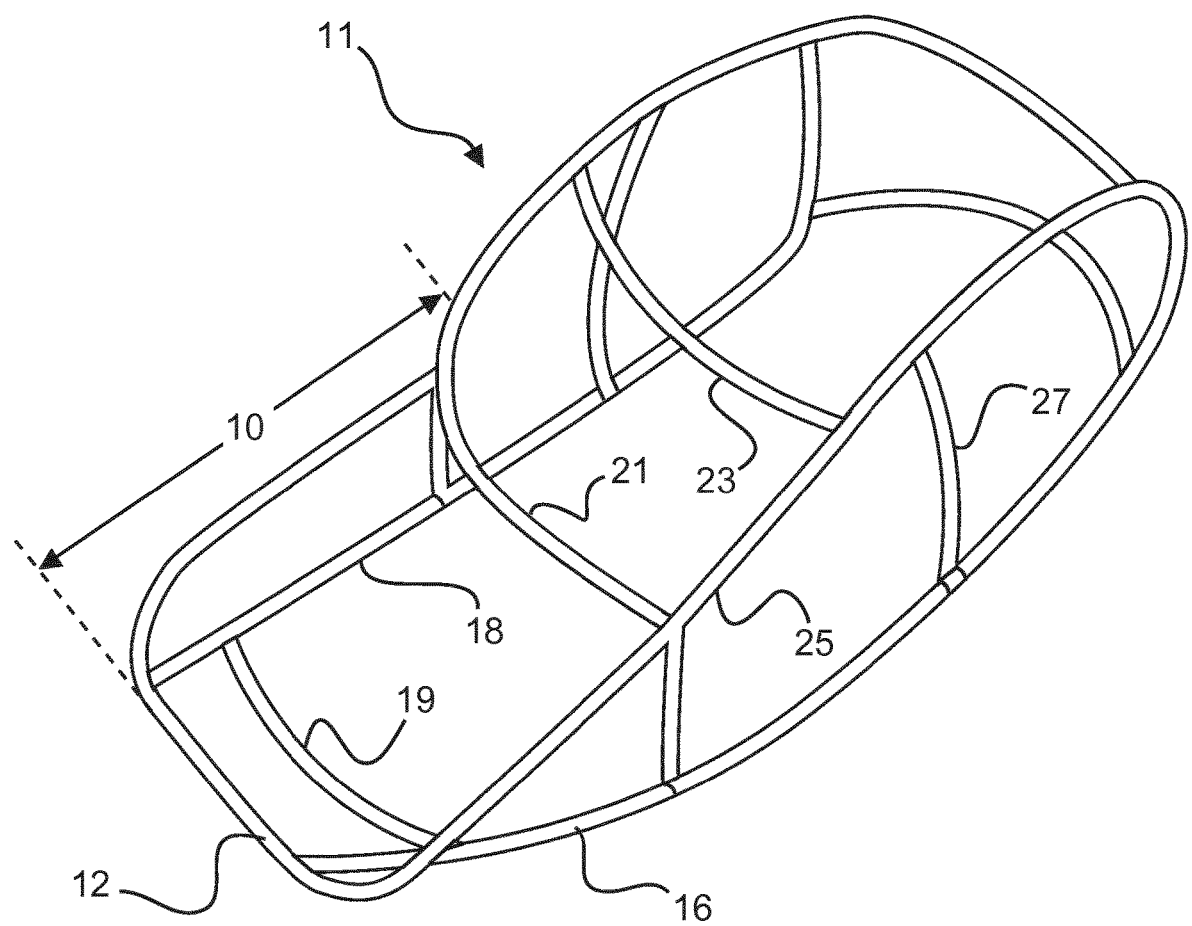
FIG. 1 schematically shows a body shell of a motor vehicle.

FIG. 1 schematically shows, in a highly simplified manner, a body shell (a body-in-white) 11 of a motor vehicle which is designed as a passenger car. The body shell 11 has a front end 10 in the front region (with respect to a direction of travel of the motor vehicle in the forward direction). The body shell is provided with a bumper crossmember 12 and also with an integral member 19 which connects a left-hand-side longitudinal member 16 and a right-hand-side longitudinal member 18 to one another.

Furthermore, FIG. 1 shows a crossmember 21 (below a windshield which is not identified by a reference symbol) and also a front roof frame 23. An A-pillar of the motor vehicle is identified by reference symbol 25, and a B-pillar is identified by reference symbol 27.

Figure 1A:
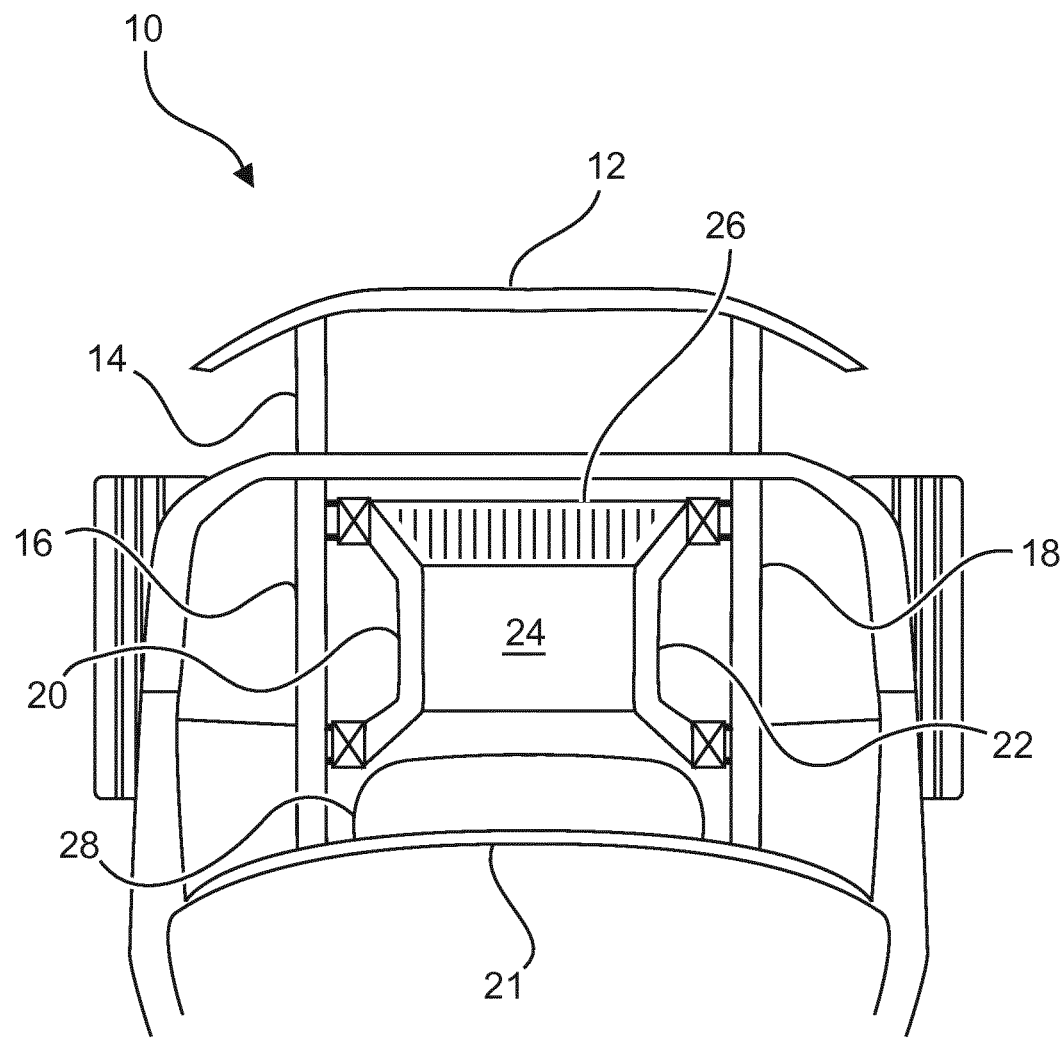
FIG. 1A shows a horizontal section (plan view) of a front end of the motor vehicle.

In FIG. 1A, the front end 10 of the motor vehicle has the abovementioned bumper crossmember 12 which is adjoined by a crash box 14. The left-hand-side longitudinal member 16 and the right-hand-side longitudinal member 18 extend from the crash box 14.

An electrical machine 24 is held at the sides by two bearing blocks (carrying blocks) 20, 22 which are connected to a front axle support 42 (FIG. 4) by means of bearings (not provided with reference symbols) and the front axle support is, in turn, connected to the longitudinal members 16 and, respectively, 18 of the body shell 11.

A deformation element 26 which is fitted to the electrical machine 24 and the bearing blocks (carrying blocks) 20, 22 extends forward from the electrical machine 24. A traction battery 28 is located behind the electrical machine 24.

Figure 2:
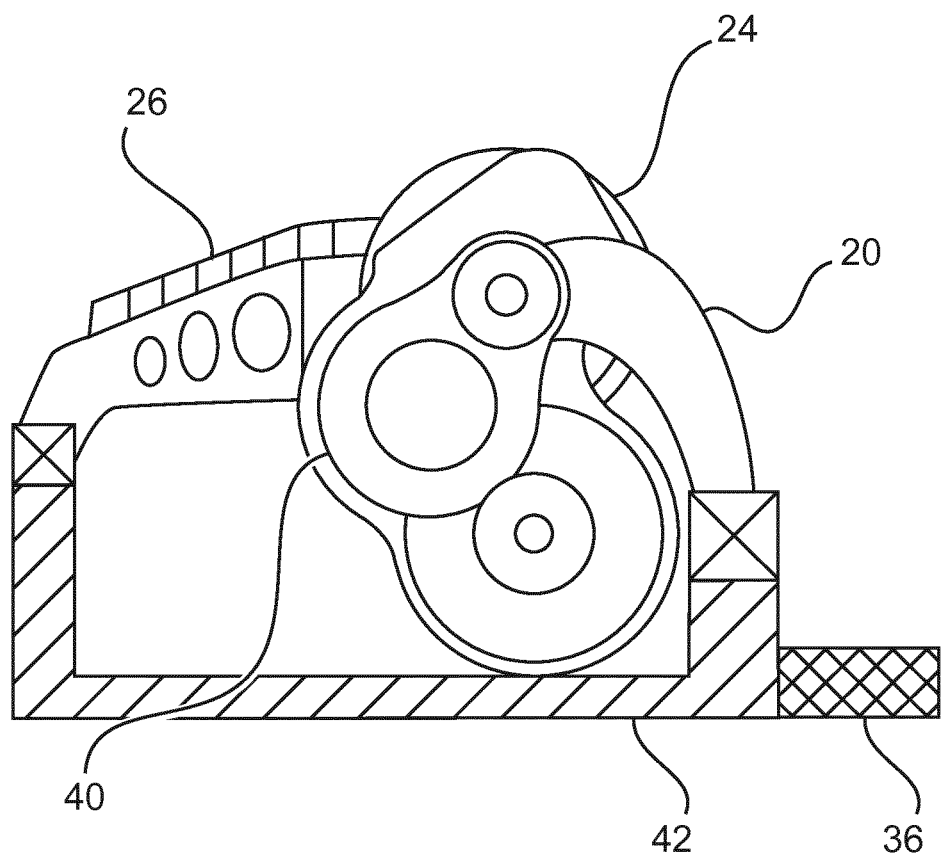
FIG. 2 to FIG. 4 each show a vertical section through the front end.

FIG. 2 shows the electrical machine 24 (partially concealed by a transmission 40 of the drive unit) with the deformation element 26 protruding forward from the electrical machine.

A crash crossmember 36 is provided between the bearing block 20 of the electrical machine 24 and the front axle support 42.

Figure 3:
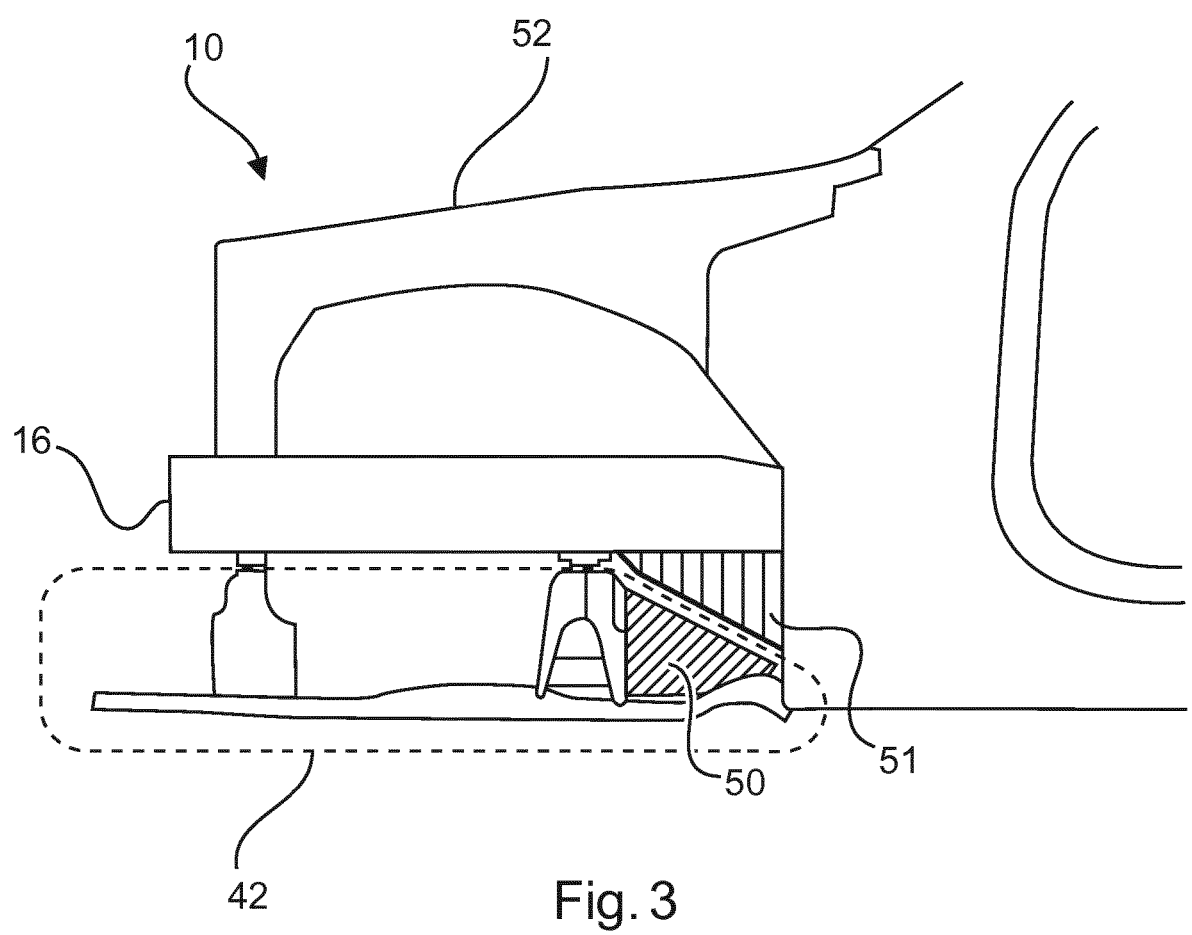

As shown in FIG. 3, a supporting element 50, which is of triangular design (in the form of a "delta element") in vertical section, is arranged between the body shell 11 and the front axle support 42. A supporting element (supporting region) 51 of the body shell 11 serves as an abutment for force support here. The area which is bordered by a dashed line in FIG. 3 illustrates which parts belong to the front axle support 42.

FIG. 4 once again illustrates the electrical machine 24, the deformation element 26 which is fitted to it, the transmission 40, the bearing block 20, the front axle support 42 and the crash crossmember 36. The electrical machine 24 and the traction battery 28 are located at approximately the same height.

Figure 4:
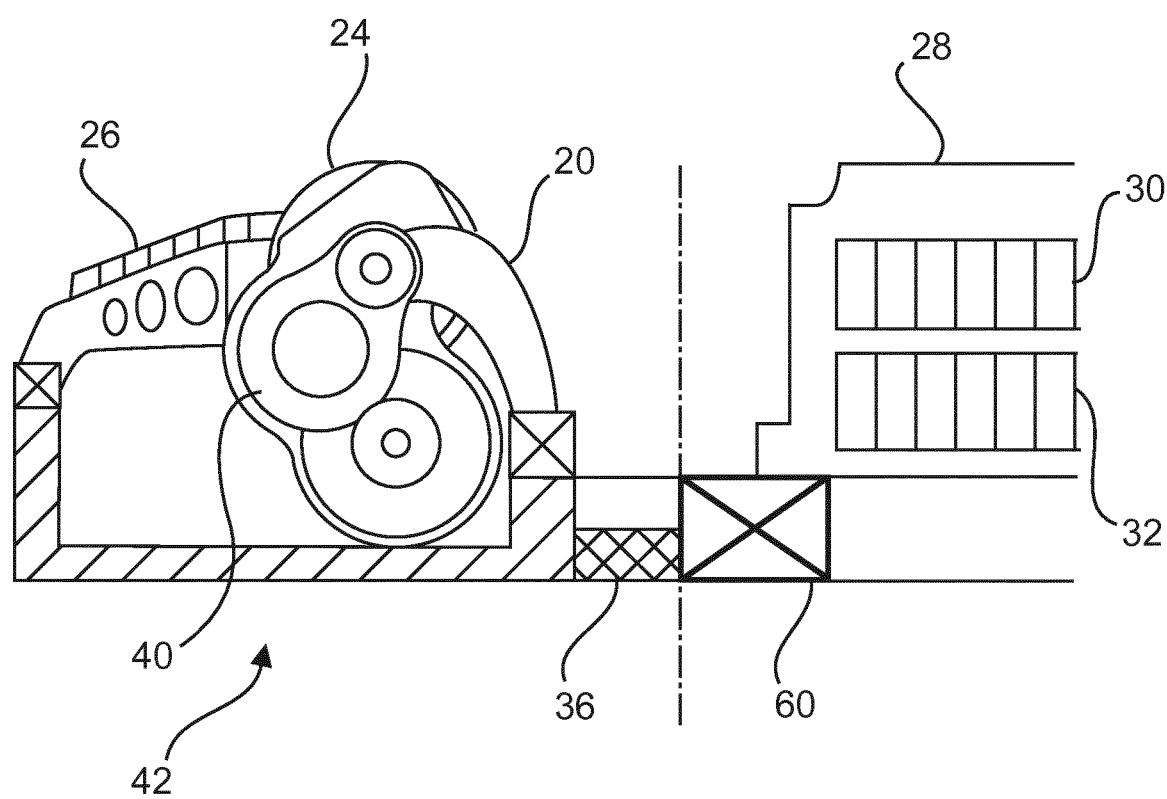

The crash crossmember 36 is located to the left of the dash-and-dot line in FIG. 4, and the traction battery 28 is located to the right of the line.

The traction battery 28 has schematically illustrated rows 30, 32 of battery cells. The traction battery 28 is held by a lower part 60 which is designed as an annular armature and, as a carrying structure, forms part of a housing of the traction battery (high-voltage storage) 28.

LIST OF REFERENCE SYMBOLS

10 Front end
11 Body shell
12 Bumper crossmember
14 Crash box
16 Longitudinal member of the body shell
18 Longitudinal member of the body shell
20 Bearing block (carrying block)
21 Crossmember
22 Bearing block (carrying block)
23 Roof frame at the front
24 Electrical machine
25 A-pillar
26 Deformation element
27 B-pillar
28 Traction battery
30 Battery cells
32 Battery cells
36 Crash crossmember
40 Transmission
42 Front axle support
50 Supporting apparatus (Delta element)
51 Supporting element
52 Body shell
60 Lower part (annular armature)

What is claimed is:

1. A motor vehicle having a crash energy-absorption device, comprising:
    a body shell;
    an electric hybrid or electric drive with an electrical machine and a traction battery; and
    an axle support, wherein
    a supporting apparatus of the axle support is provided between the body shell of the motor vehicle and the axle support, and/or
    a crash crossmember is provided for the axle support.
2. The motor vehicle according to claim 1, wherein
    the electrical machine is arranged in front of the traction battery in a direction of travel of the motor vehicle.
3. The motor vehicle according to claim 2, wherein
    the axle support is a front axle support.
4. The motor vehicle according to claim 1, wherein
    the supporting apparatus of the axle support is configured as a delta element which is fitted between a longitudinal member and the axle support of the motor vehicle.
5. The motor vehicle according to claim 1, wherein
    the body shell has a supporting element as an abutment for the supporting apparatus.
6. The motor vehicle according to claim 1, wherein
    the crash crossmember is configured for introducing a load in an event of a crash into a carrying structure of a housing of the traction battery.
7. The motor vehicle according to claim 6, wherein
    the carrying structure is configured as a lower part which is an annular armature.
8. The motor vehicle according to claim 2, further comprising:
    a deformation element which is fitted to the electrical machine arranged in front of said electrical machine.
9. The motor vehicle according to claim 8, wherein
    the deformation element has a honeycomb or sandwich structure.

* * * * *